(12) United States Patent
Kuroishi et al.

(10) Patent No.: US 10,015,343 B2
(45) Date of Patent: Jul. 3, 2018

(54) POWER-SUPPLY CONTROL DEVICE, IMAGE PROCESSING APPARATUS, POWER-SUPPLY CONTROL METHOD, AND COMPUTER READABLE MEDIUM

(71) Applicant: FUJI XEROX CO., LTD., Tokyo (JP)

(72) Inventors: Kenji Kuroishi, Kanagawa (JP);
Masafumi Ono, Kanagawa (JP);
Motofumi Baba, Kanagawa (JP);
Kazuhiko Narushima, Kanagawa (JP);
Mitsunobu Mamiya, Kanagawa (JP);
Masato Ishiyama, Kanagawa (JP);
Keiko Shiraishi, Kanagawa (JP);
Kenta Ogata, Kanagawa (JP); Kouichi Azuma, Kanagawa (JP); Hidenori Horie, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/255,251

(22) Filed: Sep. 2, 2016

(65) Prior Publication Data
US 2016/0373601 A1 Dec. 22, 2016

Related U.S. Application Data

(63) Continuation of application No. 13/230,480, filed on Sep. 12, 2011, now abandoned.

(30) Foreign Application Priority Data

Mar. 7, 2011 (JP) .................................. 2011-049380

(51) Int. Cl.
*H04N 1/00* (2006.01)
(52) U.S. Cl.
CPC ..... *H04N 1/00891* (2013.01); *H04N 1/00896* (2013.01); *H04N 1/00928* (2013.01); *H04N 2201/0094* (2013.01); *Y10T 307/469* (2015.04)

(58) Field of Classification Search
None
See application file for complete search history.

(56) References Cited

U.S. PATENT DOCUMENTS 7,794,040 B2　9/2010　Snyder
2010/0231390 A1*　9/2010　Hashimoto ........ G03G 15/5004
340/573.1

(Continued)

FOREIGN PATENT DOCUMENTS

CN　　101945197 A　　1/2011
JP　　H06-242226 A　　9/1994

(Continued)

OTHER PUBLICATIONS

Jun. 18, 2013 Office Action issued in U.S. Appl. No. 13/230,480.

(Continued)

*Primary Examiner* — Helen Zong
(74) *Attorney, Agent, or Firm* — Oliff PLC

(57) ABSTRACT

A power-supply control device includes a power-supply-state transition control section, body-capable-of-movement detection sections, a time measuring section, a transition-instruction section, and an instruction-provision-time postponement section. The power-supply-state transition control section shifts a state of an operation target section from one state to another state among power-supply states and a non-power-supply state. The body-capable-of-movement detection sections detect a body capable of movement in a region. The time measuring section measures a time over which the operation target section in one of the power-supply states is not used. The transition-instruction section provides, for the power-supply-state transition control section, an instruction for shifting to the non-power-supply state. The instruction-provision-time postponement section (Continued)

postpones an instruction-provision time at which the instruction is provided by the transition-instruction section.

17 Claims, 9 Drawing Sheets

(56) References Cited

U.S. PATENT DOCUMENTS

2010/0253965 A1   10/2010  Ogisu
2011/0004776 A1    1/2011  Tanaka
2011/0298967 A1* 12/2011  Clavin .................. G06F 1/3231
                                                                   348/372

FOREIGN PATENT DOCUMENTS

| JP | H09-166943 A | 6/1997 |
| JP | H11-202690 A | 7/1999 |
| JP | H11-284783 A | 10/1999 |
| JP | 2003-255776 A | 9/2003 |
| JP | 2004-175099 A | 6/2004 |
| JP | 2005-084631 A | 3/2005 |
| JP | 2011-028727 A | 2/2011 |

OTHER PUBLICATIONS

May 9, 2014 Office Action issued in U.S. Appl. No. 13/230,480.
Dec. 26, 2014 Office Action issued in U.S. Appl. No. 13/230,480.
Oct. 7, 2015 Office Action issued in U.S. Appl. No. 13/230,480.
Jun. 23, 2015 Communication issued in Chinese Patent Application No. 201110401741.7.
Feb. 3, 2015 Communication issued in Japanese Patent Application No. 2011-049380.

* cited by examiner

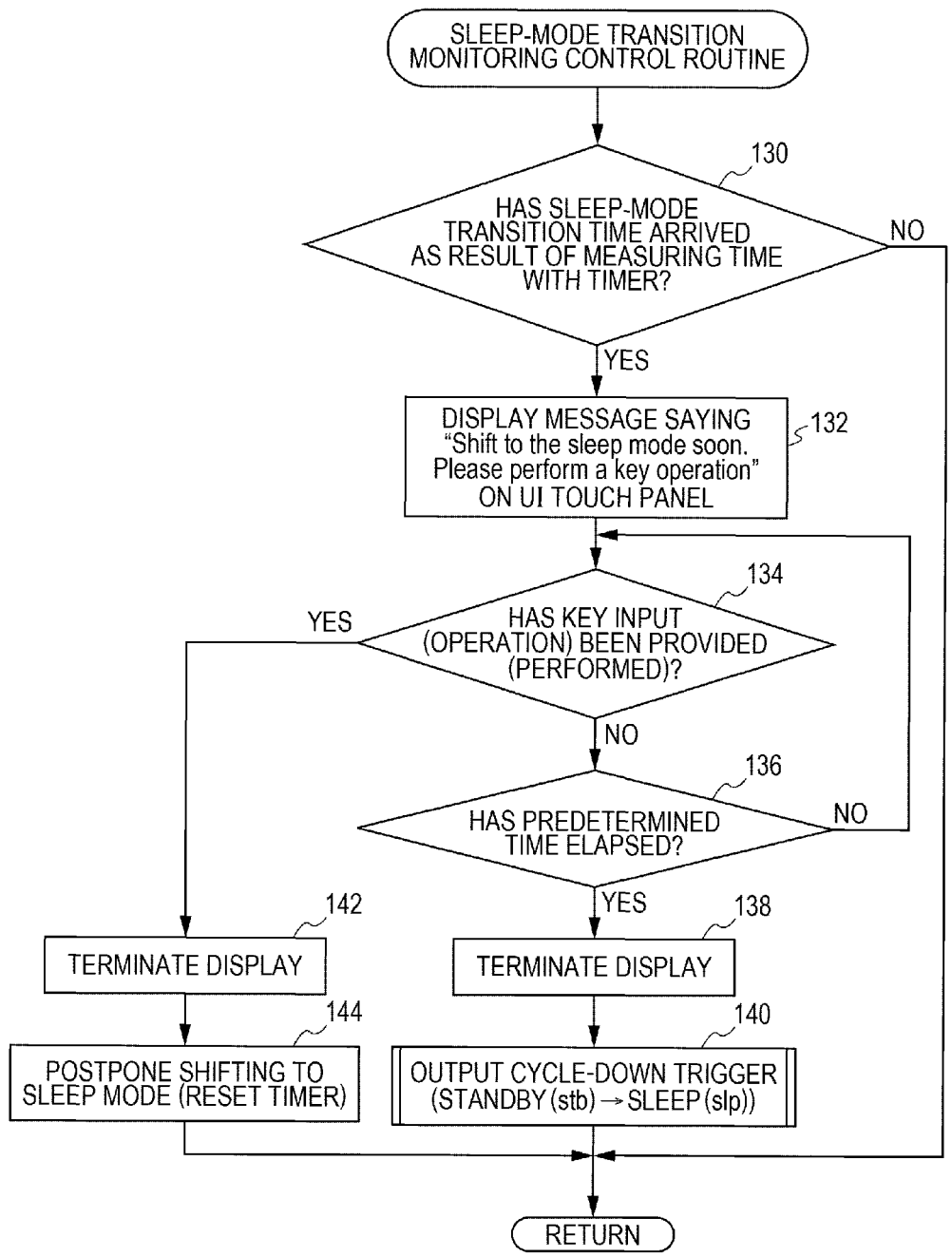

POWER-SUPPLY CONTROL DEVICE, IMAGE PROCESSING APPARATUS, POWER-SUPPLY CONTROL METHOD, AND COMPUTER READABLE MEDIUM

CROSS-REFERENCE TO RELATED APPLICATIONS

This is a Continuation of U.S. application Ser. No. 13/230,480 filed Sep. 12, 2011, which claims priority to Japanese Application No. 2011-049380 filed Mar. 7, 2011.

BACKGROUND (i) Technical Field

The present invention relates to a power-supply control device, an image processing apparatus, a power-supply control method, and a computer readable medium storing a program.

SUMMARY

According to an aspect of the invention, there is provided a power-supply control device including a power-supply-state transition control section, multiple body-capable-of-movement detection sections, a time measuring section, a transition-instruction section, and an instruction-provision-time postponement section. The power-supply-state transition control section shifts a state of an operation target section from one state to another state among multiple power-supply states and a non-power-supply state. The operation target section is a section which operates by receiving supply of power from a mains power source section. A power consumption in each of the multiple power-supply states is a corresponding one of power consumptions different from one another. The non-power-supply state is a state in which supply of power is not received from the mains power source section or a state in which supply of power that is lower than power determined in advance and that is necessary for control of determining whether or not power is to be supplied is received from the mains power source section. The multiple body-capable-of-movement detection sections detect a body capable of movement in a region which is set in advance. Each of the multiple body-capable-of-movement detection sections has a corresponding one of detection conditions different from one another. The time measuring section measures a time over which the operation target section in one of the multiple power-supply states is not used. In a case in which the operation target section continues not being used even when the time measured by the time measuring section has reached a non-power-supply-state transition time that is determined in advance, the transition-instruction section provides, for the power-supply-state transition control section, an instruction for shifting to the non-power-supply state. In a case in which the body capable of movement is detected by the multiple body-capable-of-movement detection sections when an instruction-provision time at which the instruction is provided by the transition-instruction section has arrived, the instruction-provision-time postponement section postpones the instruction-provision time.

BRIEF DESCRIPTION OF THE DRAWINGS

Exemplary embodiment(s) of the present invention will be described in detail based on the following figures, wherein:

FIG. 9 is a flowchart illustrating a sleep-mode transition monitoring control routine.

DETAILED DESCRIPTION

Figure 1:
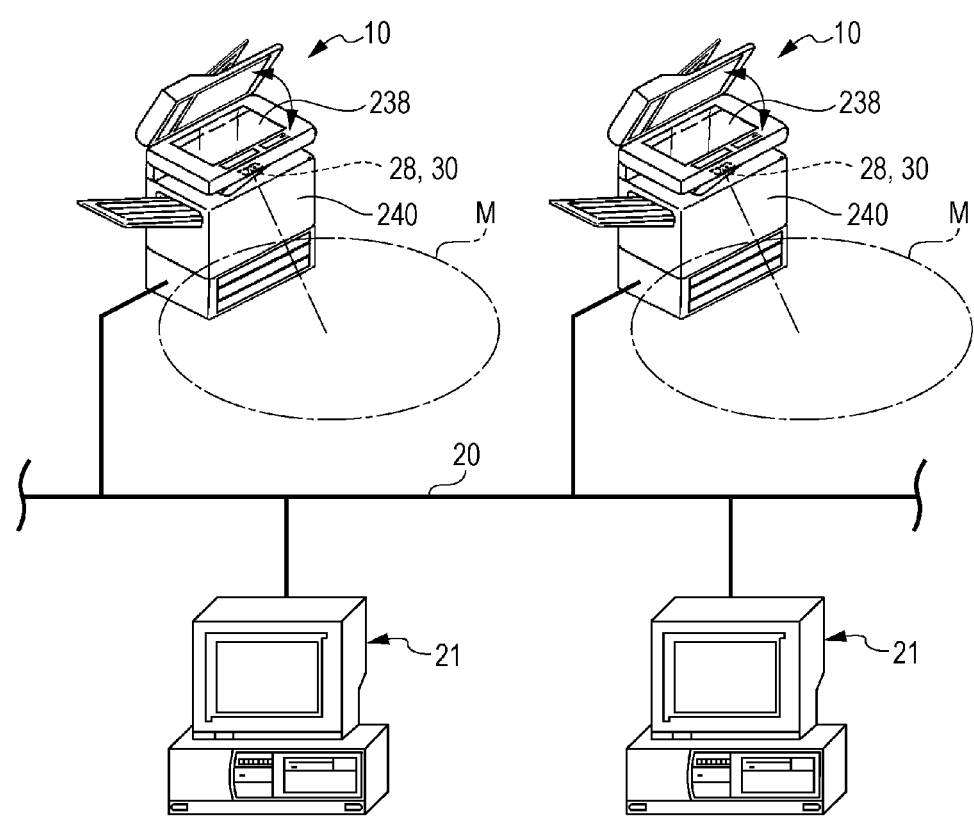
FIG. 1 is a communication-network connection diagram in which an image processing apparatus according to a present exemplary embodiment is included.

As illustrated in FIG. 1, an image processing apparatus 10 according to a present exemplary embodiment is connected to a network-communication network 20 such as the Internet. In FIG. 1, two image processing apparatuses 10 are connected. However, the number of image processing apparatuses 10 that are connected is not limited, and may be one or be three or more.

Furthermore, multiple personal computers (PCs) 21 that serve as information terminal apparatuses are connected to the network-communication network 20. In FIG. 1, two PCs 21 are connected. However, the number of PCs 21 that are connected is not limited, and may be one or be three or more. Moreover, the information terminal apparatuses are not limited to the PCs 21. Additionally, wired connection does not necessarily need to be used for the network-communication network 20. In other words, the network-communication network 20 may be a communication network in which information is transmitted and received using wireless connection.

As illustrated in FIG. 1, regarding each of the image processing apparatuses 10, there is a case in which, for example, a remote operation of transferring data and of providing an instruction for performing image formation (printing) is performed using one of the PCs 21 on the image processing apparatus 10. Alternatively, there is a case in which a user stands up in front of the image processing apparatus 10, and in which the user provides, by performing various types of operations on the image processing apparatus 10, an instruction for performing a process, such as a copy process, a scan process (an image read process), or a facsimile transmission/reception process.

Figure 2:
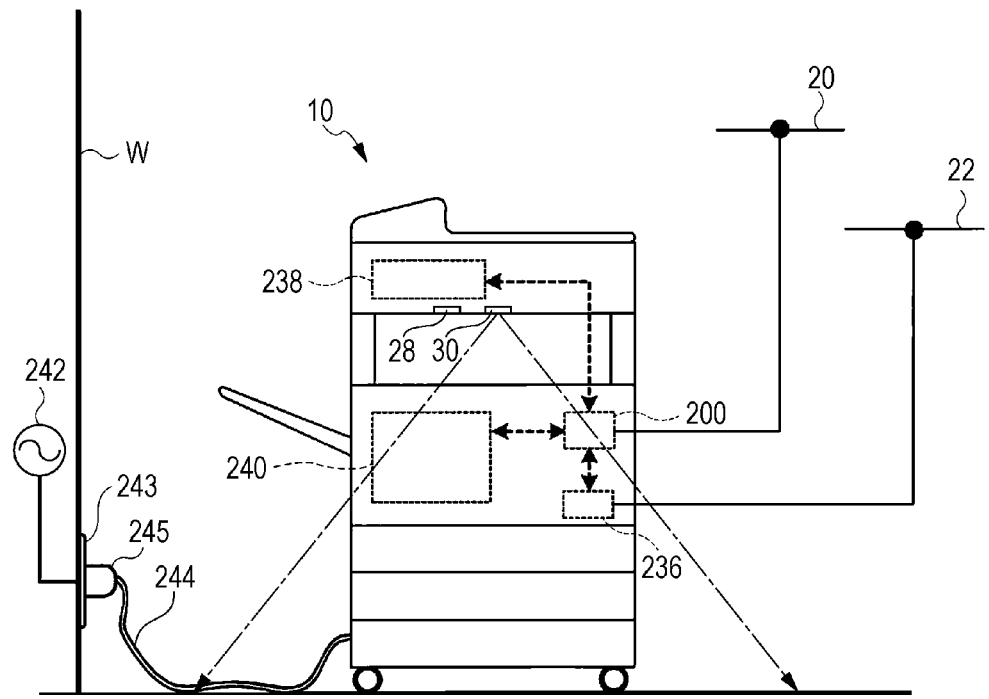
FIG. 2 is a schematic diagram of the image processing apparatus according to the present exemplary embodiment.

FIG. 2 illustrates the image processing apparatus 10 according to the present exemplary embodiment. The image processing apparatus 10 includes an image forming section 240 that forms an image on a recording sheet, an image reading section 238 that reads a document image, and a facsimile-communication control circuit 236. The image processing apparatus 10 includes a main controller 200. The main controller 200 controls the image forming section 240, the image reading section 238, and the facsimile-communication control circuit 236, thereby temporarily storing image data regarding a document image read by the image reading section 238 or transmitting the read image data to the image forming section 240 or to the facsimile-communication control circuit 236.

The network-communication network 20 such as the Internet is connected to the main controller 200. A telephone network 22 is connected to the facsimile-communication control circuit 236. The main controller 200 is connected to, for example, a host computer via the network-communication network 20. The main controller 200 has a function of receiving image data and a function of performing facsimile reception and facsimile transmission using the telephone network 22 via the facsimile-communication control circuit 236.

In the image reading section 238, a document plate, a scanning drive system, and photoelectric conversion elements are provided. On the document plate, positioning of a document is performed. The scanning drive system scans an image formed on the document that is placed on the document plate, thereby irradiating the image with light. The photoelectric conversion elements, such as CCDs, receive reflected light or transmitted light, which are obtained by scanning the image with the scanning drive system, and convert the reflected light or transmitted light into electric signals.

The image forming section 240 includes a photoconductor drum. Around the photoconductor drum, a charging device, a scanning exposure unit, an image development unit, a transfer unit, and a cleaning unit are provided. The charging device uniformly charges the photoconductor drum. The scanning exposure unit scans the photoconductor using a light beam on the basis of image data. The image development unit develops an electrostatic latent image that has been formed by scanning the photoconductor drum with the scanning exposure unit so as to expose the photoconductor drum to the light beam. The transfer unit transfers, onto a recording sheet, an image that has been visualized on the photoconductor drum. The cleaning unit cleans the surface of the photoconductor drum after transfer is performed by the transfer unit. Furthermore, a fixing unit that fixes the image which has been transferred onto the recoding sheet is provided along a path along which the recording sheet is transported.

Regarding the image processing apparatus 10, a plug 245 is attached to an end of an input power line 244. The plug 245 is inserted in a plug plate 243 of a mains power source 242 for which installation of wires to a wall surface W is performed, whereby the image processing apparatus 10 receives supply of power from the mains power source 242.

Hardware Configuration of Control System

Figure 3:
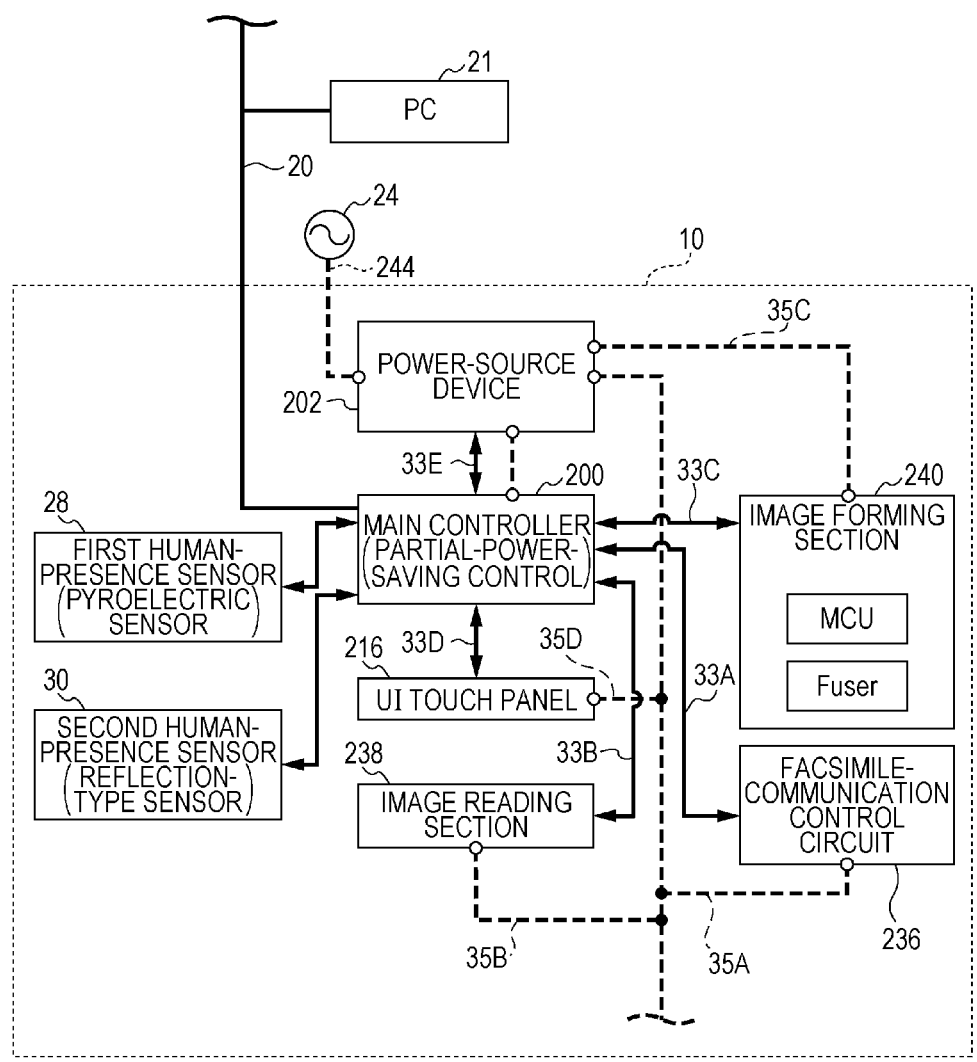
FIG. 3 is a block diagram illustrating a configuration of a control system of the image processing apparatus according to the present exemplary embodiment.

FIG. 3 is a schematic diagram of a hardware configuration of a control system of the image processing apparatus 10.

The network-communication network 20 is connected to the main controller 200. The facsimile-communication control circuit 236, the image reading section 238, the image forming section 240, and a user interface (UI) touch panel 216 are connected to the main controller 200 via buses 33A to 33D, respectively, such as data buses and control buses.

In other words, the main controller 200 controls the individual processing sections of the image processing apparatus 10.

Furthermore, the image processing apparatus 10 includes a power-source device 202, and the power-source device 202 is connected to the main controller 200 via a bus 33E. The power-source device 202 receives supply of power from the mains power source 242. The power-source device 202 is provided with power supply lines 35A to 35D that are used independently of one another so that power is supplied, through each of the power supply lines 35A to 35D, to a corresponding one of the main controller 200, the facsimile-communication control circuit 236, the image reading section 238, the image forming section 240, and the UI touch panel 216. Accordingly, power is supplied to the individual processing sections (devices) on a processing-section-by-processing-section basis (in a mode state that is a power-supply state), or supply of power to the individual processing sections is interrupted on a processing-section-by-processing-section basis (in a sleep mode), whereby so called partial-power-saving control can be realized by the main controller 200.

Moreover, two human-presence sensors, i.e., a first human-presence sensor 28 and a second human-presence sensor 30, are connected to the main controller 200, and monitor existence/non-existence of a person in the periphery of the image processing apparatus 10. The first human-presence sensor 28 and the second human-presence sensor 30 will be described below.

Functional Block Diagram of Configuration for Partial Power Saving

Figure 4:
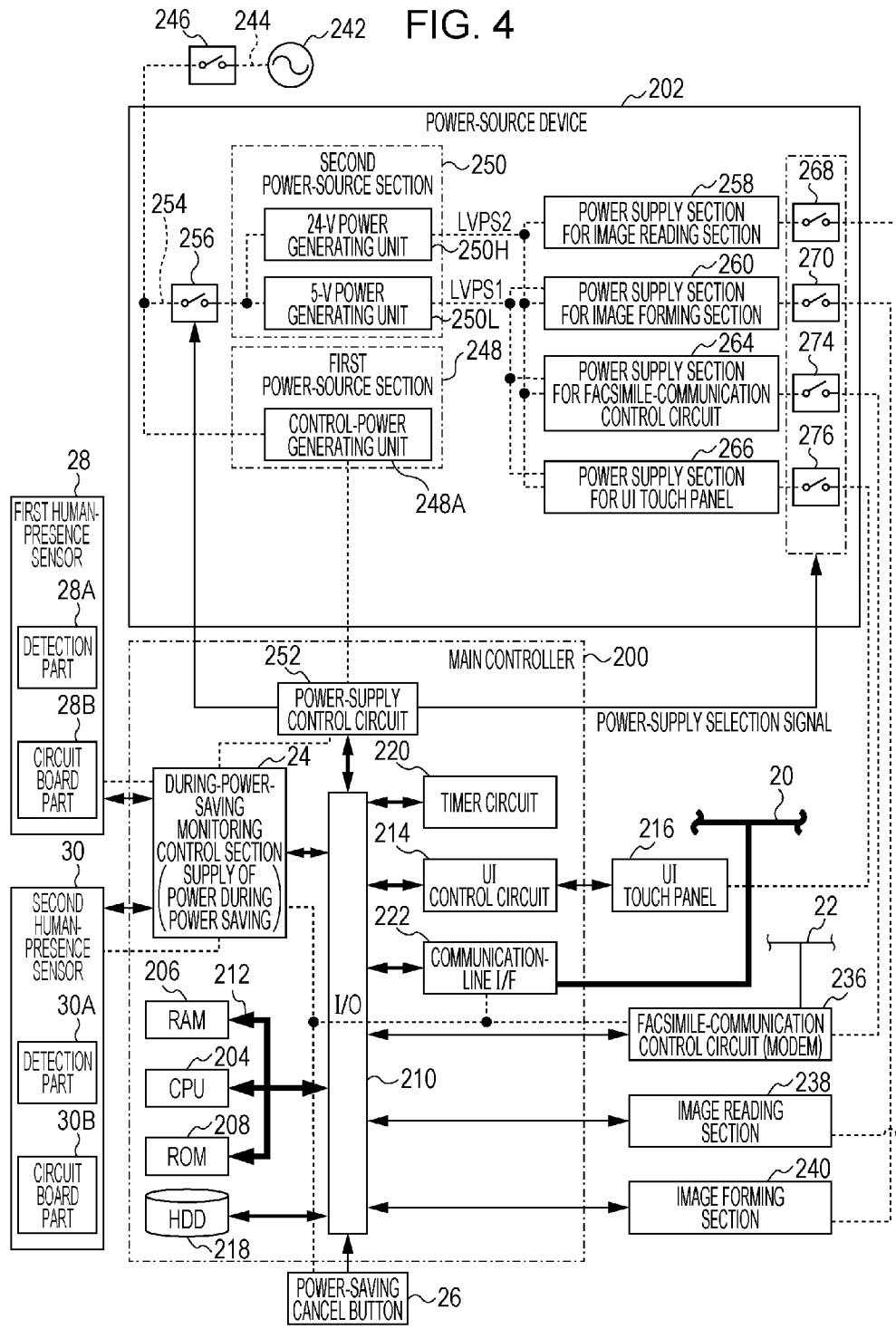
FIG. 4 is a schematic diagram illustrating a main controller and a control system of a power-source device on a function-by-function basis in the present exemplary embodiment.

FIG. 4 is a schematic diagram of a configuration in which the processing sections (which are referred to as "devices", "modules", or the like in some cases) that are controlled by the main controller 200, the main controller 200, and power lines, through which power is supplied to the individual devices, of the power-source device 202, and so forth are provided. In the present exemplary embodiment, supply or non-supply of power can be realized on a processing-section-by-processing-section basis in the image processing apparatus 10 (partial power saving).

Main Controller 200

As illustrated in FIG. 4, the main controller 200 includes a central processing unit (CPU) 204, a random-access memory (RAM) 206, a read-only memory (ROM) 208, an input/output (I/O) (input/output section) 210, and a bus 212 including a data bus, a control bus, and so forth that are used to connect the CPU 204, the RAM 206, the ROM 208, the I/O 210 to each other. A user interface (UI) touch panel 216 is connected to the I/O 210 via a UI control circuit 214. Furthermore, a hard disk (HDD) 218 is connected to the I/O 210. The CPU 204 operates in accordance with a program recorded in the ROM 208, the hard disk 218, or the like, thereby realizing functions of the main controller 200. Note that the program may be installed from a recording medium (a compact disc read-only memory (CD-ROM), a digital versatile disk read-only memory (DVD-ROM), or the like) on which the program is stored, and the CPU 204 may operate in accordance with the program, whereby image processing functions may be realized.

A timer circuit 220 and a communication-line interface (I/F) 222 are connected to the I/O 210. Furthermore, the individual devices, which are the facsimile-communication control circuit (a modem) 236, the image reading section 238, and the image forming section 240, are connected to the I/O 210.

Note that, the timer circuit 220 measures an initial timer setting time in order to provide an opportunity for setting the facsimile-communication control circuit 236, the image reading section 238, and the image forming section 240 to be in a power-saving state (a non-power-supply state). The timer circuit 220 includes timers. Hereinafter, one of the timers included in the timer circuit 220 is referred to as a "timer".

Power is supplied from the power-source device 202 to the main controller 200 and the individual devices (the facsimile-communication control circuit 236, the image reading section 238, and the image forming section 240) (see dotted lines illustrated in FIG. 4). Note that, although one line (a dotted line) is illustrated as a power line in FIG. 4, the power line includes a few wiring lines in reality.

Power-Source Device 202

As illustrated in FIG. 4, the input power line 244, which is routed from the mains power source 242, is connected to a main switch 246. The main switch 246 is turned on, whereby supply of power to a first power-source section 248 and a second power-source section 250 becomes enabled.

The first power-source section 248 includes a control-power generating unit 248A. The control-power generating unit 248A is connected to a power-supply control circuit 252 of the main controller 200. The power-supply control circuit 252 supplies power to the main controller 200, and is connected to the I/O 210. The power-supply control circuit 252 performs, in accordance with a control program executed by the main controller 200, switching control for causing electricity to be conducted/not conducted through power-supply lines through which power is supplied to the individual devices (the facsimile-communication control circuit 236, the image reading section 238, and the image forming section 240).

In contrast, regarding a power line 254 that is to be connected to the second power-source section 250, a first sub-power-source switch 256 (hereinafter, referred to as a "SW-1" in some cases) is intervened between the power line 254 and the second power-source section 250. The SW-1 is controlled by the power-supply control circuit 252 so as to be turned on/off.

Furthermore, the second power-source section 250 includes a 24-V power generating unit 250H (LVPS2) and a 5-V power generating unit 250L (LVPS1). The 24-V power generating unit 250H (LVPS2) is a power source that is used, for example, for a motor.

The 24-V power generating unit 250H (LVPS2) and the 5-V power generating unit 250L (LVPS1) of the second power-source section 250 are selectively connected to a power supply section 258 for the image reading section 238, a power supply section 260 for the image forming section 240, a power supply section 264 for the facsimile-communication control circuit 236, and a power supply section 266 for the UI touch panel 216.

The power supply section 258 for the image reading section 238 uses the 24-V power generating unit 250H (LVPS2) as an input source, and is connected to the image reading section 238 via a second sub-power-source switch 268 (hereinafter, referred to as a "SW-2" in some cases).

The power supply section 260 for the image forming section 240 uses the 24-V power generating unit 250H (LVPS2) and the 5-V power generating unit 250L (LVPS1) as input sources, and is connected to the image forming section 240 via a third sub-power-source switch 270 (hereinafter, referred to as a "SW-3" in some cases).

The power supply section 264 for the facsimile-communication control circuit 236 uses the 24-V power generating unit 250H (LVPS2) and the 5-V power generating unit 250L (LVPS1) as input sources, and is connected to the facsimile-communication control circuit 236 via a fifth sub-power-source switch 274 (hereinafter, referred to as a "SW-5" in some cases).

The power supply section 266 for the UI touch panel 216 uses the 5-V power generating unit 250L (LVPS1) and the 24-V power generating unit 250H (LVPS2) as input sources, and is connected to the UI touch panel 216 via a sixth sub-power-source switch 276 (hereinafter, referred to as a "SW-6" in some cases).

As in the case of the first sub-power-source switch 256, each of the second sub-power-source switch 268, the third sub-power-source switch 270, the fifth sub-power-source switch 274, and the sixth sub-power-source switch 276 is controlled, in accordance with a power-supply selection signal supplied from the power-supply control circuit 252 of the main controller 200, so as to be turned on/off. Switches and wiring lines that are used to supply power from the 24-V power generating unit 250H and the 5-V power generating unit 250L are configured so as to form two channels, although they are not illustrated. Furthermore, the second sub-power-source switch 268, the third sub-power-source switch 270, the fifth sub-power-source switch 274, and the sixth sub-power-source switch 276 may be disposed in the individual devices to which power is to be supplied, instead of being disposed in the power-source device 202.

In the above-described configuration, the power sources connected so as to select the individual devices (the facsimile-communication control circuit 236, the image reading section 238, and the image forming section 240) on a function-by-function basis are provided, and power is not supplied to devices that are not necessary for a specified function. Accordingly, minimum necessary power is only necessary.

Monitoring Control

Here, regarding the main controller 200 in the present exemplary embodiment, in some cases, the functions thereof are partially stopped in order to consume minimum necessary power. Alternatively, in some cases, supply of power to elements including most sections of the main controller 200 is stopped. Such cases are collectively referred to a "sleep mode (a power saving mode)".

For example, a timer is activated at a point in time when image processing finishes, whereby the operation state of the image processing apparatus 10 can be shifted to the sleep mode. In other words, as a result of measuring a predetermined time with the timer since the timer has been activated, supply of power is stopped. Note that, if a certain operation (an operation using hard keys or the like) is performed before the predetermined time elapses, as a matter of course, measurement of the predetermined time with the timer, which is performed in order to use for shifting to the sleep mode, is stopped, and the timer is activated at a point in time when the next image processing finishes.

In contrast, a during-power-saving monitoring control section 24 is provided as an element that always receives supply of power during the sleep mode, and is connected to the I/O 210. The during-power-saving monitoring control section 24 may be configured using, for example, an integrated circuit (IC) chip, which is referred to as an "application-specific integrated circuit (ASIC)", in which an operation program is stored, and which includes a CPU, a RAM, a ROM, and so forth that are processed in accordance with the operation program.

When monitoring during the power saving mode is performed, it is supposed that, for example, a print request is received from a communication-line detector or a facsimile (FAX) reception request is received from a FAX line detector, and, in accordance with the request, the during-power-saving monitoring control section 24 controls the first sub-power-source switch 256, the second sub-power-source switch 268, the third sub-power-source switch 270, the fifth sub-power-source switch 274, and the sixth sub-power-source switch 276, thereby supplying power to devices that have been set in the power saving mode.

Furthermore, a power-saving cancel button 26 is connected to the I/O 210 of the main controller 200. A user performs an operation on the power-saving cancel button 26 during the power saving mode, whereby the power saving mode can be cancelled.

Here, in order to perform monitoring in the sleep mode, minimum necessary power may be supplied to the power-saving cancel button 26 and the individual detectors in addition to the during-power-saving monitoring control section 24. In other words, supply of power that is equal to or lower than a value determined in advance (for example, equal to or lower than 0.5 W) and that is necessary for control of determining whether or not power is to be supplied may be received even in the sleep mode that is a non-power-supply state.

Figure 5:
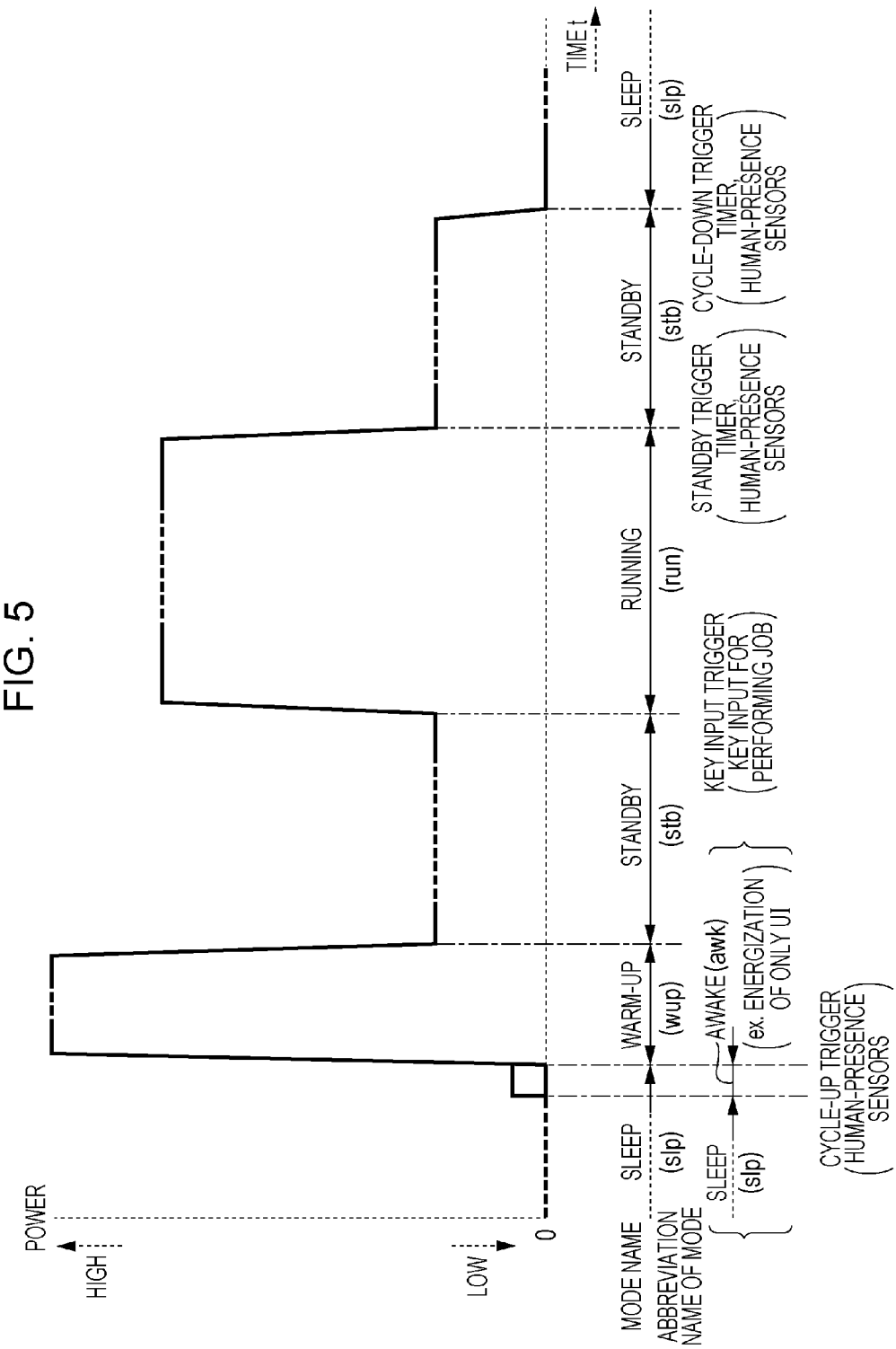
FIG. 5 is a timing chart illustrating individual mode states of the image processing apparatus and events that provide opportunities for shifting from one mode state to another mode state among the mode states.

Note that, in a specific time period (an awake mode (awk) illustrated in FIG. 5) of the sleep mode, minimum necessary power that is, for example, necessary for input systems including the UI touch panel 216 is supplied.

In the sleep mode, when a user stands up in front of the image processing apparatus 10, and, then, performs an operation on the power-saving cancel button 26 to resume supply of power, there are some cases in which it takes time until the image processing apparatus 10 becomes activated.

For this reason, in the present exemplary embodiment, the first human-presence sensor 28 and the second human-presence sensor 30 are provided in the during-power-saving monitoring control section 24. Additionally, in the sleep mode, the first human-presence sensor 28 and the second human-presence sensor 30 detect a user before the user presses the power-saving cancel button 26, and supply of power is early resumed, so that the user can quickly use the image processing apparatus 10. Note that, although the power-saving cancel button 26, the first human-presence sensor 28, and the second human-presence sensor 30 are used in combination, everything may be monitored only by the first human-presence sensor 28 and the second human-presence sensor 30.

The first human-presence sensor 28 and the second human-presence sensor 30 include detection parts 28A and 30A and circuit board parts 28B and 30B, respectively. The circuit board parts 28B and 30B adjust the sensitivities of signals that have been detected by the detection parts 28A and 30A, respectively, and generate output signals.

Note that, regarding the first human-presence sensor 28, the term "human presence" is used. However, the term "human presence sensor" is a proper noun used in accordance with the present exemplary embodiment. The human-presence sensor at least needs to detect a person. In other words, the human-presence sensor may also detect a body capable of movement other than a person. Accordingly, in the description give below, there are some cases in which a target to be detected by the human-presence sensor is a "person". However, in the future, a robot or the like that performs an operation instead of a person may be included in examples of a target to be detected by the human-presence sensor. Note that, in contrast, when a specific sensor capable of exclusively detecting a person exists, the specific sensor may be applied.

The specification of the first human-presence sensor 28 includes detection of movement of a person in the periphery of the image processing apparatus 10. In this case, the first human-presence sensor 28 is typified by, for example, an infrared ray sensor using a pyroelectric effect of a pyroelectric element (a pyroelectric sensor). In the present exemplary embodiment, a pyroelectric sensor is applied as the first human-presence sensor 28.

The most distinctive feature of the pyroelectric sensor that is applied as the first human-presence sensor 28 and that uses a pyroelectric effect of a pyroelectric element is that the detection region thereof is large. Furthermore, because the sensor detects movement of a person, when a person is standing still in the detection region, the sensor does not detect the existence of the person. For example, supposing that a high-level signal is output when a person moves, when the person becomes still in the detection region, the signal changes from the high-level signal to a low-level signal.

In contrast, regarding the specification of the second human-presence sensor 30, a sensor that detects presence/absence (existence/non-existence) of a person is applied. The sensor that is applied as the second human-presence sensor 30 is typified by, for example, a reflection-type sensor including a light-projecting unit and a light-receiving unit (a reflection-type sensor). Note that a configuration in which the light-projecting unit and the light-receiving unit are separated from each other may be used.

The most distinctive feature of the reflection-type sensor that is applied as the second human-presence sensor 30 is that the reflection-type sensor reliably detects presence/absence of a person in accordance with whether or not light that is to enter the light-receiving unit is interrupted. Furthermore, because the amount of light entering the light-receiving unit is limited by the amount of light projected from the light-projecting unit or the like, the detection region of the second human-presence sensor 30 is a comparatively short region.

Note that, if sensors applied as the first human-presence sensor 28 and the second human-presence sensor 30 can individually achieve functions described below, each of the sensors applied as the first human-presence sensor 28 and the second human-presence sensor 30 is not limited to a pyroelectric sensor or a reflection-type sensor.

A pattern of applying the first human-presence sensor 28 and the second human-presence sensor 30 having the above-mentioned configurations needs to be set in accordance of the operation state (mode state) of the image processing apparatus 10.

FIG. 5 is a timing chart illustrating individual mode states of the image processing apparatus 10 and events that provide opportunities for shifting from one mode state to another mode state among the mode states.

When processing is not performed, regarding the operation state of the image processing apparatus 10, the image processing apparatus 10 enters the sleep mode. In the present exemplary embodiment, power is supplied only to the during-power-saving monitoring control section 24.

Here, when there is an opportunity for cycle-up (when a cycle-up trigger is detected or an input operation (a key input) using an operation section is performed), the operation state of the image processing apparatus 10 is shifted to a warm-up mode.

Note that a power-saving cancel operation that is performed by an operator, a signal or a piece of information that are based on results of detection performed by the first human-presence sensor 28 and the second human-presence sensor 30, or the like is used as the cycle-up trigger.

In order to cause the image processing apparatus 10 to promptly enter a state in which processing can be performed, a power consumption in the warm-up mode is the largest among power consumptions in the individual modes. However, for example, an induction heating (IH) heater is utilized as a heater of the fixing unit, whereby a warm-up-mode time is comparatively shorter than that in a case of utilizing a heater using a halogen lamp.

When a warm-up operation in the warm-up mode finishes, the operation mode of the image processing apparatus 10 is shifted to a standby mode.

The standby mode is literally a mode in which "preparation for cases is completed". The image processing apparatus 10 is in a state in which an operation associated with image processing can be immediately performed.

Accordingly, when an operation for performing a job is performed as a key input, the operation state of the image processing apparatus 10 is shifted to a running mode. Image processing based on the specified job is performed.

When image processing finishes (in a case in which multiple sequential jobs wait, when all of the sequential jobs finish), the operation state of the image processing apparatus 10 is shifted to the standby mode. If an instruction for performing a job is provided during the standby mode, the operation state of the image processing apparatus 10 is shifted to the running mode again. When a cycle-down trigger is detected or when a time that is determined in advance elapses, the operation state of the image processing apparatus 10 is shifted to the sleep mode.

Note that a signal or a piece of information that are based on results of detection performed by the first human-presence sensor 28 and the second human-presence sensor 30, or the like is used as the cycle-down trigger.

Note that, shifting the operation state of the image processing apparatus 10 from one mode state to another mode state among the mode states when the image processing apparatus 10 operates in reality is not always performed in a sequential order illustrated in the timing chart. For example, processing may be stopped in the standby mode after the warm-up mode, and the operation state of the image processing apparatus 10 may be shifted to the sleep mode.

In the individual mode states that are described above, the first human-presence sensor 28 and the second human-presence sensor 30 have a function of providing opportunities for the following operation situations.

(First Operation Situation) Control of Shifting to Standby Mode Because Body Capable of Movement (User) has been Detected During Sleep Mode During the sleep mode, power may always be supplied to each of the first human-presence sensor 28 and the second human-presence sensor 30. However, first, power is supplied only to the first human-presence sensor 28 that monitors the surroundings of the image processing apparatus 10. At a point in time when a body capable of movement (a user) is detected by the first human-presence sensor 28, power may be supplied to the second human-presence sensor 30.

(Second Operation Situation) Partial-Power-Saving Control Performed on Processing Sections During Running Mode Supposing that partial power saving is performed in accordance with whether or not there are sequential jobs or in accordance with the contents of sequential jobs, when the first human-presence sensor 28 and the second human-presence sensor 30 detect that a user temporarily moves away from the image processing apparatus 10, the number of processing sections that are targets for power saving may be increased.

(Third Operation Situation) Control of Shifting to Sleep Mode Because Body Capable of Movement (User) has not been Detected During Standby Mode Control of shifting from the standby mode to the sleep mode may be performed in combination with control, which is performed using the timer, of shifting the operation state of the image processing apparatus 10.

For example, it is supposed that the timer is mainly used. In this case, when a user moves away from the image processing apparatus 10 to some extent (when the second human-presence sensor 30 no longer detects the user), the timer setting time of the timer is reduced. Furthermore, when the user is no longer completely present (when the first human-presence sensor 28 no longer detects the user), control of forcibly shifting the operation state of the image processing apparatus 10 to the sleep mode can be performed even in a case in which a time that should be measured by the timer remains.

Next, an action in the present exemplary embodiment will be described.

As described above, the operation state of the image processing apparatus 10 is shifted from one mode state to another mode state among the sleep mode, the warm-up mode, and the running mode. The amount of supplied power differs with each of the mode states.

In the image processing apparatus 10 according to the present exemplary embodiment, when conditions determined in advance (for example, a time-out of the timer) are satisfied, the operation state of the image processing apparatus 10 is shifted to the sleep mode. In the sleep mode, not only supply of power to the individual devices, which are the facsimile-communication control circuit 236, the image reading section 238, and the image forming section 240, is interrupted, but also supply of power to the main controller 200 excluding the during-power-saving monitoring control section 24, and the UI touch panel 216 is interrupted. In this case, the function of the power-saving cancel button 26 connected to the main controller 200 may also be stopped. Accordingly, the image processing apparatus 10 enters a state that is equivalent to a state in which a main power switch is completely turned off when the image processing apparatus 10 is viewed from the surroundings thereof. In other words, the image processing apparatus 10 enters a state in which, by viewing from the surroundings thereof, it can be made sure that the sleep mode is assuredly set (realization of "visualization").

Here, in the present exemplary embodiment, the first human-presence sensor 28 and the second human-presence sensor 30 are applied, and information obtained using the first human-presence sensor 28 and the second human-presence sensor 30 is used as a trigger for shifting the operation state of the image processing apparatus 10 from one mode state to another mode state (among the individual mode states), whereby control for reducing the power consumption of the entire image processing apparatus 10 is performed.

For control using the first human-presence sensor 28 and the second human-presence sensor 30 as units that output the cycle-up trigger and the cycle-down trigger which are described above, control using the first human-presence sensor 28 and the second human-presence sensor 30 will be described below.

Cycle-Up Trigger "Control of Shifting from Sleep Mode to Warm-Up Mode"

Regarding the first human-presence sensor 28, it is supposed that the first human-presence sensor 28 has, as a detection region (hereinafter, referred to as a "first region F"), a region larger than the detection region of the second human-presence sensor 30 in the periphery of the image processing apparatus 10. For example, the detection region of the first human-presence sensor 28 ranges about 2 m to about 3 m (see the first region F (far) illustrated in FIG. 6), although depending on the environment of a place in which the image processing apparatus 10 is disposed.

In contrast, it is supposed that the second human-presence sensor 30 has, as a detection region (hereinafter, referred to as a "second region N"), a region smaller than the detection region (the first region F) of the first human-presence sensor 28, which is described above. For example, the detection region of the second human-presence sensor 30 ranges so that a user can perform an operation on the UI touch panel 216 or the hard keys of the image processing apparatus 10, and ranges from about 0 m to about 0.5 m (see the second region N (near) illustrated in FIG. 6).

The specification of the first human-presence sensor 28 includes detection of movement of a person. The first human-presence sensor 28 is typified by, for example, an infrared ray sensor using a pyroelectric effect of a pyroelectric element.

The most distinctive feature of the first human-presence sensor 28 is that the detection region thereof is large (the detection region ranges from about 2 m to about 3 m or may range from 2 m or less to 3 m or more). Furthermore, because the first human-presence sensor 28 detects movement of a person, when a person is standing still in the detection region, the first human-presence sensor 28 does not detect the existence of the person. For example, supposing that a high-level signal is output when a person moves, when the person becomes still in the detection region, the signal changes from the high-level signal to a low-level signal.

As a matter of course, the meaning of the term "still" in the present exemplary embodiment also includes a state in which a person is completely still, as in a still image captured by a still camera or the like. However, for example, the meaning of the term "still" also includes a state in which a person is standing still in front of the image processing apparatus 10 for the sake of performing an operation. Accordingly, the meaning of the term "still" includes a state in which a person slightly moves in a range that is determined in advance (for example, movement associated with breathing) or a state in which a person moves a hand, a leg, the neck, or the like.

Note that it is not necessarily necessary to use a scheme in which the sensitivity of the first human-presence sensor 28 is adjusted after the meaning of the term "still" is defined as described above. The sensitivity of the first human-presence sensor 28 may be comparatively roughly and typically adjusted, and may depend on the detection state of the first human-presence sensor 28. In other words, when the first human-presence sensor 28 outputs one of binary signals (for example, a high-level signal), it may be indicated that a person is moving. When a person exists in the detection region of the first human-presence sensor 28 and the other signal of the binary signals (for example, a low-level signal) is output, it may be indicated that the person is standing still.

The specification of the second human-presence sensor 30 includes detection of presence/absence (existence/non-existence) of a person. The second human-presence sensor 30 is typified by, for example, a reflection-type sensor including a light-projecting unit and a light-receiving unit. Note that a configuration in which the light-projecting unit and the light-receiving unit are separated from each other may be used.

The most distinctive feature of the second human-presence sensor 30 is that the second human-presence sensor 30 reliably detects presence/absence of a person in accordance with whether or not light that is to enter the light-receiving unit is interrupted. Furthermore, because the amount of light entering the light-receiving unit is limited by the amount of light projected from the light-projecting unit or the like, the detection region of the second human-presence sensor 30 is a comparatively short region (the detection region ranges from about 0 m to about 0.5 m as described above).

Here, the first human-presence sensor 28 and the second human-presence sensor 30, which are mounted in the image processing apparatus 10 according to the present exemplary embodiment, are connected to the during-power-saving monitoring control section 24 as described above. Detection signals from the first human-presence sensor 28 and the second human-presence sensor 30 are input to the during-power-saving monitoring control section 24.

The during-power-saving monitoring control section 24 makes distinctions among the following three situations on the basis of the detection signals output from the first human-presence sensor 28 and the second human-presence sensor 30.

(First Situation)

A person approaches, for the sake of using the image processing apparatus 10, a position at which the person can perform an operation on the image processing apparatus 10.

Figure 6:
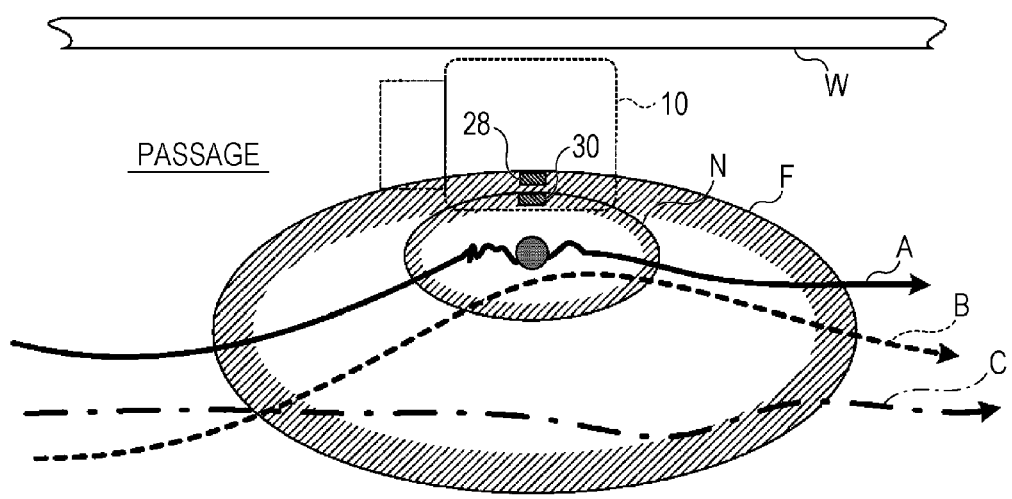
FIG. 6 is a plan view of the image processing apparatus and the periphery thereof, which illustrates an example in the present exemplary embodiment.

The distinction between the first situation and the other situations can be made by establishing the following flow: first, it is detected by the first human-presence sensor 28 that a person has entered the first region F; after that, it is detected by the second human-presence sensor 30 that the person has entered the second region N while the person is being continuously detected by the first human-presence sensor 28; and, then, the person (standing still) in the second region N is not detected by the first human-presence sensor 28 (see movement (a pattern A) indicated by the arrow A illustrated in FIG. 6).

(Second Situation)

A person approaches, not for the sake of using the image processing apparatus 10, a position at which the person can perform an operation on the image processing apparatus 10.

The distinction between the second situation and the other situations can be made by establishing the following flow: first, it is detected by the first human-presence sensor 28 that a person has entered the first region F; after that, it is detected by the second human-presence sensor 30 that the person has entered the second region N while the person is being continuously detected by the first human-presence sensor 28; the person leaves the second region N (the person is not detected by the second human-presence sensor 30) while (the movement of) the person in the second region N is being continuously detected by the first human-presence sensor 28; and, furthermore, the person leaves the first region F (the person is not detected by the first human-presence sensor 28) (see movement (a pattern B) indicated by the arrow B illustrated in FIG. 6).

(Third Situation)

Although a person does not approach a position at which the person can perform an operation on the image processing apparatus 10, the person reaches a certain position so that the situation may change from the third situation to the first or second situation.

The distinction between the third situation and the other situations can be made by establishing the following flow: first, it is detected by the first human-presence sensor 28 that a person has entered the first region F; and, after that, the person leaves the first region F (the person is not detected by the first human-presence sensor 28) while the person is not being detected by the second human-presence sensor 30 (see movement (a pattern C) indicated by the arrow C illustrated in FIG. 6).

The during-power-saving monitoring control section 24 determines the three types of situations, which are described above, on the basis of the detection signals of the first human-presence sensor 28 and the second human-presence sensor 30. First, the during-power-saving monitoring control section 24 supplies, on the basis of determination of the three types of situations, power to the input systems including the UI touch panel 216 and the hard keys that are connected to the main controller 200, the hard keys including the power-saving cancel button 26 and being used to provide instructions for performing a copy process and so forth. This operation state may be defined as one portion of the sleep mode. Alternatively, because the amount of supplied power increases, compared with the amount of power supplied only to the during-power-saving monitoring control section 24, this operation state may be defined as the awake mode "awk" (see description in the curly brackets provided below the range of the sleep mode illustrated in the transition diagram of FIG. 5).

After that, an operation is performed on the UI touch panel 216, the hard keys, or the like to specify a function, whereby the during-power-saving monitoring control section 24 supplies power to devices that are necessary for the function specified using the operation.

Note that, as in a case in which an operation is performed on the power-saving cancel button 26, power may be simultaneously supplied to all of the devices.

Here, in the present exemplary embodiment, for an opportunity (the cycle-up trigger) for resuming supply of power to the image processing apparatus 10 during the sleep mode as described above, the surroundings of the image processing apparatus 10 are monitored by the first human-presence sensor 28 and the second human-presence sensor 30. Whether a person is approaching the image processing apparatus 10 for the sake of performing an operation or not for the sake of performing an operation is distinguished, and whether or not supply of power is to be resumed is determined.

FIG. 6 is a plan view of the image processing apparatus 10 and the periphery thereof. The first region F is set at a position distant from the image processing apparatus 10 that is placed along the wall surface W, and the second region N is set at a position close to the image processing apparatus 10.

Here, in FIG. 6, patterns A to C are illustrated as patterns, which are broadly classified, of movement of a person in a state in which the image processing apparatus 10 is disposed as described above.

The pattern A indicates a movement path along which a person approaches a position at which the person can perform an operation on the image processing apparatus 10, along which the person becomes still to perform an operation for the sake of using the image processing apparatus 10, and along which the person moves away from the image processing apparatus 10. The position of the person who moves along the movement path sequentially changes as follows: outside the regions (a first stage); in the first region F (a second stage); in the second region N (a third stage, and, further, when the person becomes still, it is determined that the present stage classification is a fourth stage, so that the power saving mode is cancelled); in the first region F (a fifth stage); and outside the regions (a sixth stage).

The pattern B indicates a movement path along which a person approaches a position at which the person can perform an operation on the image processing apparatus 10, and along which the person passes by the image processing apparatus 10. The position of the person who moves along the movement path sequentially changes as follows: outside the regions (a first stage); in the first region F (a second stage); in the second region N (a third stage (the person continues moving)); in the first region F (a fourth stage); and outside the regions (a fifth stage).

The pattern C indicates a movement path along which a person passes through the vicinity of the image processing apparatus 10 without approaching a position at which the person can perform an operation on the image processing apparatus 10. The position of the person who moves along the movement path sequentially changes as follows: outside the regions (a first stage); in the first region F (a second stage); and outside the regions (a third stage).

Note that states in which a person approaches and moves away from the image processing apparatus 10 and which are described in a sequential order are represented by the above-mentioned "stages".

Cycle-Down Trigger "Control of Shifting from Standby Mode to Sleep Mode"

In the above-described situations which are illustrated in FIG. 6 and in which a body capable of movement moves, an opportunity (the cycle-down trigger) for shifting from the standby mode to the sleep mode, which are illustrated in FIG. 5, i.e., for shifting from a power-supply state to the state in which supply of power is stopped, will be described below.

An opportunity indicated by the cycle-down trigger is provided, basically, on the basis of a non-power-supply-state transition time t, which is determined in advance, of the timer.

In other words, the timer is activated at a point in time when the operation state of the image processing apparatus 10 is shifted from the running mode to the standby mode, which are illustrated in FIG. 5. When an input operation using the UI touch panel 216 or the like is not performed or an external signal is not input during the period of the non-power-supply-state transition time t, the operation state of the image processing apparatus 10 is shifted to the sleep mode.

When the operation state of the image processing apparatus 10 has been shifted to the sleep mode, the next cycle-up takes time. Accordingly, when a high priority is assigned to convenience, the timer setting time needs to be set to be comparatively long. When a high priority is assigned to energy saving performance, the timer setting time needs to be set to be comparatively short. In view of the tradeoffs, in reality, the timer setting time is set to be an average value.

For this reason, in the present exemplary embodiment, the timer is mainly used as a section that provides an opportunity (the cycle-down trigger) for shifting from the standby mode to the sleep mode. Additionally, the non-power-supply-state transition time t that is a timer setting time of the timer is adjusted on the basis of detection of a body capable of movement with the first human-presence sensor 28 and the second human-presence sensor 30.

Figure 7:
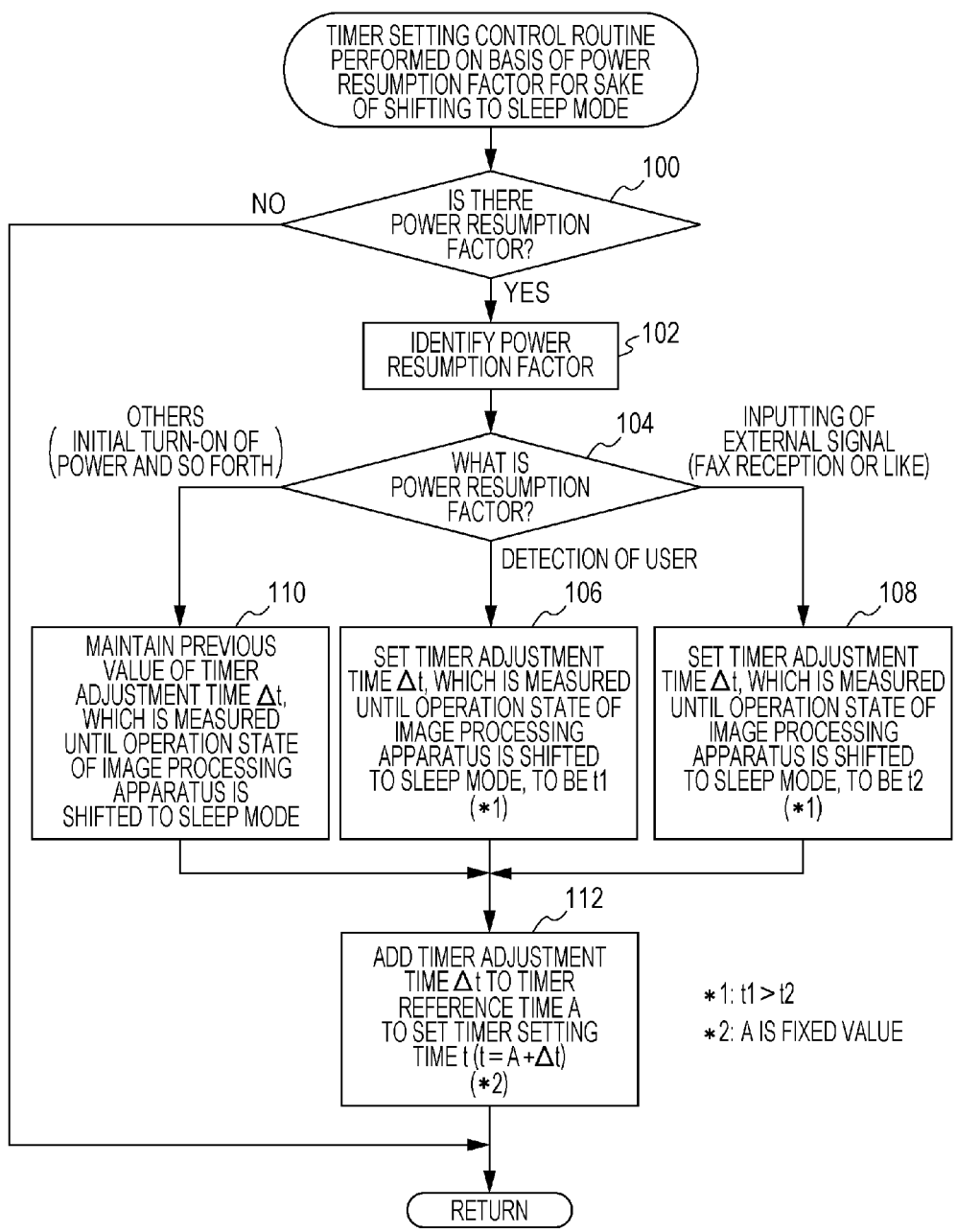
FIG. 7 is a flowchart illustrating a timer setting control routine that is performed, when the operation state of the image processing apparatus has been shifted from a sleep mode via a warm-up mode to a standby mode, on the basis of a power resumption factor for the sake of shifting to the sleep mode.

FIG. 7 is a flowchart illustrating a timer setting control routine that is performed, when the operation state of the image processing apparatus 10 has been shifted from the sleep mode via the warm-up mode to the standby mode, on the basis of a power resumption factor for the sake of shifting to the sleep mode.

First, in step 100, whether or not there is a power resumption factor is determined. When a result of determination is NO, the timer setting control routine ends.

Furthermore, when a result of determination in step 100 is YES, the flow proceeds to step 102, and the power resumption factor is identified. The flow proceeds to step 104. In step 104, the power resumption factor is determined.

When it is determined in step 104 that power is resumed because a user has been detected with the first human-presence sensor 28 and the second human-presence sensor 30 (hereinafter, referred to as "user-detection resumption"), the flow proceeds to step 106, and a timer adjustment time Δt that is measured until the operation state of the image processing apparatus 10 is shifted to the sleep mode is set to be t1 (where a relationship t1>t2 is established). The flow proceeds to step 112.

When it is determined in step 104 that power is resumed because an external signal indicating facsimile reception, a print instruction, or the like has been input (hereinafter, referred to as "external-signal-input resumption"), the flow proceeds to step 108, and the timer adjustment time Δt that is measured until the operation state of the image processing apparatus 10 is shifted to the sleep mode is set to be t2 (where a relationship t1>t2 is established). The flow proceeds to step 112.

When it is determined in step 104 that the power resumption factor is neither the user-detection resumption nor the external-signal-input resumption which are mentioned above and is derived from the initial turn-on of the power and so forth ("the others"), the flow proceeds to step 110, and the previous value of the timer adjustment time Δt that is measured until the operation state of the image processing apparatus 10 is shifted to the sleep mode is maintained. The flow proceeds to step 112.

In step 112, the timer adjustment time Δt is added to a timer reference time A that is set in advance (where A is a fixed value) to set the initial timer setting time t which is the non-power-supply-state transition time t (so as to establish an equation t=A+Δt). The timer setting control routine ends.

Figure 8:
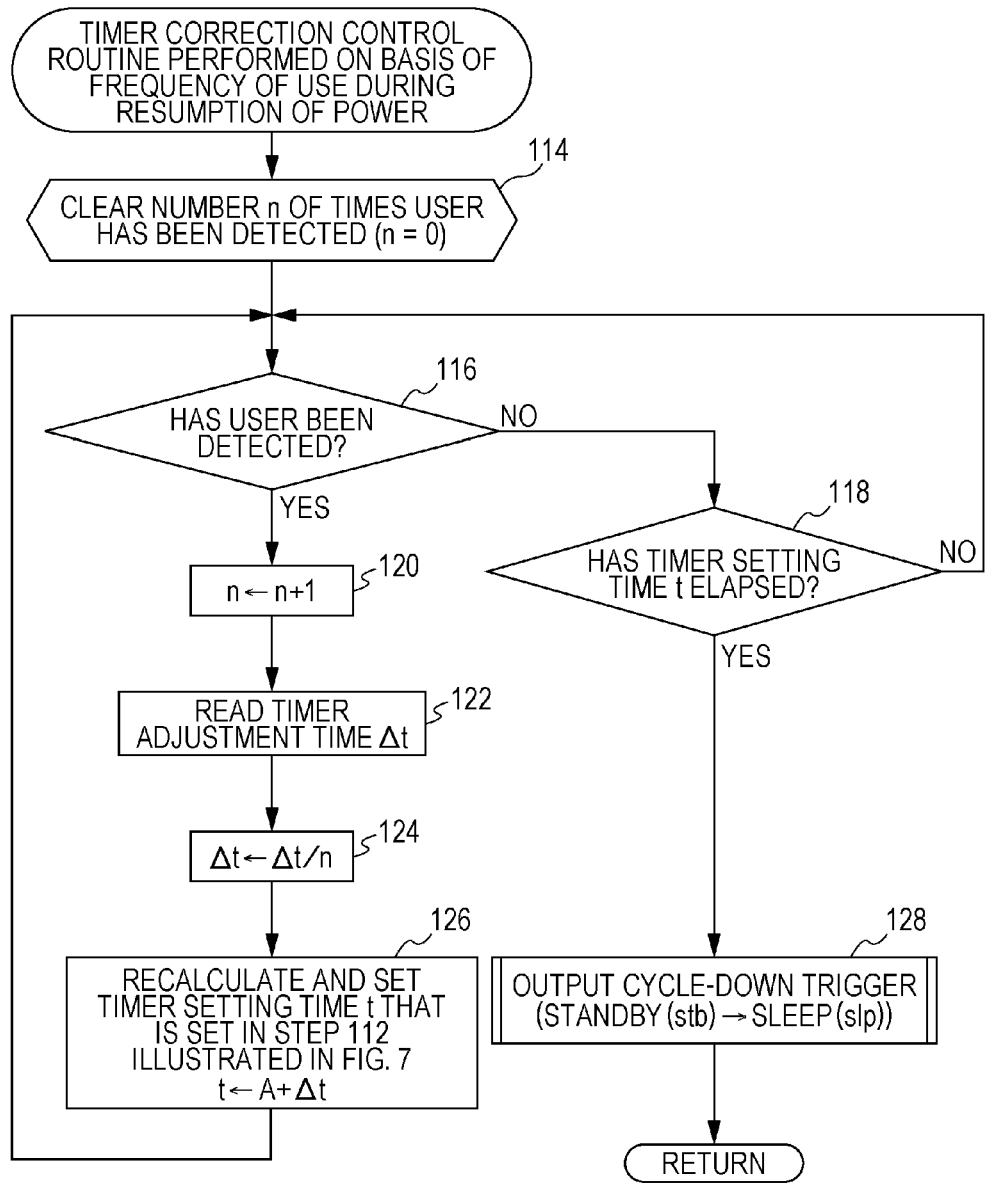
FIG. 8 is a flowchart illustrating a timer correction control routine that is performed on the basis of the frequency of use during resumption of power for the sake of shifting to the sleep mode.

Next, FIG. 8 is a flowchart illustrating a timer correction control routine that is performed on the basis of the frequency of use during resumption of power for the sake of shifting to the sleep mode.

First, in step 114, a number n of times a user has been detected is cleared (so as to establish an equation n=0). Next, the flow proceeds to step 116, and whether or not a user has been detected by the second human-presence sensor 30 is determined. Note that the second human-presence sensor 30 is a sensor which detects that a person faces the image processing apparatus 10 as shown using the second region N illustrated in FIG. 6. The second human-presence sensor 30 may be used in consideration of the accuracy of detection of a user. However, the first human-presence sensor 28 may be used. Furthermore, the first human-presence sensor 28 and the second human-presence sensor 30 may be used in combination.

When a result of determination in step 116 is NO, the flow proceeds to step 118, and whether or not the timer setting time, i.e., the non-power-supply-state transition time t, has elapsed is determined. When a result of determination is NO, the flow proceeds to step 116. The above-described steps are repeatedly performed.

When a result of determination in step 118 is YES, the flow proceeds to step 128, and the cycle-down trigger is output. The operation state of the image processing apparatus 10 is shifted from the standby mode to the sleep mode.

Furthermore, when a result of determination in step 116 is YES, the flow proceeds to step 120, and the number n of times a user has been detected is incremented by one (so as to establish a relationship n←n+1). Next, the flow proceeds to step 122. The timer adjustment time Δt that is set as illustrated in FIG. 7 is read. The flow proceeds to step 124, and the timer adjustment time Δt is corrected using the number n of times a user has been detected (so as to establish a relationship Δt←Δt/n).

In step 126 that is the next step, the timer setting time t that is set in step 112 illustrated in FIG. 7 is recalculated (so as to establish a relationship t←A+Δt). The flow returns to step 116.

More specifically, the timer adjustment time Δt decreases with the number n of times a user has been detected. In other words, a time taken until it is determined that a result of determination in step 118 is YES is reduced, so that a time taken until the operation state of the image processing apparatus 10 is shifted to the sleep mode is reduced.

Control of Postponing Cycle-Down Trigger

As described above, once the operation state of the image processing apparatus 10 is shifted to the sleep mode, the next cycle-up takes time. Accordingly, supposing a situation in which a user tries to perform an input operation when a transition time has arrived as a result of measuring a time with the timer, a postponement time period is provided.

FIG. 9 is a flowchart illustrating a sleep-mode transition monitoring control routine. Note that a flowchart structure may be used, in which the sleep-mode transition monitoring control routine illustrated in the flowchart is implemented as an interrupt routine in a case in which a result of determination in step 118 illustrated in FIG. 8 is YES.

In step 130, whether or not a sleep-mode transition time has arrived as a result of measuring a time with the timer is determined. When a result of determination is NO, the sleep-mode transition monitoring control routine ends.

When a result of determination in step 130 is YES, the flow proceeds to step 132, and a message is displayed on the UI touch panel 216. Supposing that a user exists near the image processing apparatus 10, the message urges the user to perform an operation using the UI touch panel 216 or the like, such as a massage saying that "Shift to the sleep mode soon. Please perform a key operation". The flow proceeds to step 134.

In step 134, whether or not a key input operation has been performed is determined. When a result of determination is NO, the flow proceeds to step 136, and whether or not a time (a predetermined time) that is determined in advance has elapsed is determined. When a result of determination in step 136 is NO, the flow returns to step 134, and steps 134 and 136 are repeatedly performed. Note that, because the predetermined time in step 134 is a postponement time period, the predetermined time may be appropriately set on a user side.

When a result of determination in step 136 is YES, the flow proceeds to step 138, and the display is terminated. Next, the flow proceeds to step 140. The cycle-down trigger is output, and the operation state of the image processing apparatus 10 is shifted from the standby mode to the sleep mode. Note that, when the sleep-mode transition monitoring control routine illustrated in FIG. 9 is implemented as an interrupt routine after step 118, which is illustrated in FIG. 8, step 140 is unnecessary.

In contrast, when a result of determination in step 134 is YES, the flow proceeds to step 142, and the display is terminated. Next, the flow proceeds to step 144, and shifting to the sleep mode is postponed (the timer is reset). The sleep-mode transition monitoring control routine ends.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a first sensor configured to detect movement of a user within a first range that defines the detectable range of the first sensor; and
a second sensor configured to detect the user within a second range that defines the detectable range of the second sensor, the second range being smaller than the first range and being contained within the first range such that the second sensor cannot detect the user outside of the second range, wherein
the information processing apparatus is configured so that the second sensor becomes ready to detect the user in response to detection of movement of the user by the first sensor, and
in response to detection of the user by the second sensor, the information processing apparatus is configured to become ready to perform a function other than detecting of the user by the second sensor.

2. The information processing apparatus according to claim 1, wherein
the information processing apparatus shifts to a first mode in which acceptance of a processing instruction is restricted in response to a predetermined time period elapsing.

3. The information processing apparatus according to claim 2, wherein
the predetermined time period is reduced in response to the second sensor not detecting the user.

4. The information processing apparatus according to claim 2, wherein
the predetermined time period is a time period during which movement of the user is not detected by the second sensor.

5. An information processing apparatus comprising:
a first sensor configured to detect movement of a user within a first range that defines the detectable range of the first sensor; and
a second sensor configured to detect the user within a second range that defines the detectable range of the second sensor, the second range being smaller than the first range and being contained within the first range such that the second sensor cannot detect the user outside of the second range, wherein
the information processing apparatus is configured so that the second sensor shifts from a non-detecting mode to a detecting mode in response to detection of movement of the user by the first sensor, and
in response to detection of the user by the second sensor, the information processing apparatus is configured to shift from a first mode in which acceptance of a processing instruction is restricted to a second mode in which acceptance of the processing instruction is allowed.

6. The information processing apparatus according to claim 5, wherein
the information processing apparatus shifts to the first mode in response to a predetermined time period elapsing.

7. The information processing apparatus according to claim 6, wherein
the predetermined time period is reduced in response to the second sensor not detecting the user.

8. The image processing apparatus according to claim 6, wherein
the predetermined time period is a time period during which movement of the user is not detected by the second sensor.

9. An information processing apparatus comprising:
a first sensor configured to detect movement of a user within a first range that defines the detectable range of the first sensor; and
a second sensor configured to detect the user within a second range that defines the detectable range of the second sensor, the second range being smaller than the first range and being contained within the first range such that the second sensor cannot detect the user outside of the second range, wherein
the information processing apparatus is configured so that the second sensor is supplied with power in response to detection of movement of the user by the first sensor, and
in response to detection of the user by the second sensor, power is supplied to at least one part of the information processing apparatus that lacks power.

10. The information processing apparatus according to claim 9, wherein
supply of the power to the at least one part of the information processing apparatus is stopped in response to a predetermined time period elapsing.

11. The information processing apparatus according to claim 10, wherein
the predetermined time period is reduced in response to the second sensor not detecting the user.

12. The information processing apparatus according to claim 10, wherein
the predetermined time period is a time period during which movement of the user is not detected by the second sensor.

13. An image processing apparatus comprising:
a first sensor configured to detect movement of a user within a first range that defines the detectable range of the first sensor; and
a second sensor configured to detect the user within a second range that defines the detectable range of the second sensor, the second range being smaller than the first range and being contained within the first range such that the second sensor cannot detect the user outside of the second range, wherein
the image processing apparatus is configured so that the second sensor becomes ready to detect the user in response to detection of movement of the user by the first sensor, and
in response to detection of the user by the second sensor, the image processing apparatus is configured to become ready to accept an image processing instruction.

14. The image processing apparatus according to claim 13, further comprising a controller configured to output the image processing instruction which is accepted by the image processing apparatus.

15. The image processing apparatus according to claim 13, wherein the image processing apparatus shifts to a first mode in which acceptance of the image processing instruction is restricted in response to a predetermined time period elapsing.

16. The image processing apparatus according to claim 15, wherein the predetermined time period is reduced in response to the second sensor not detecting the user.

17. The information processing apparatus according to claim 15, wherein the predetermined time period is a time period during which movement of the user is not detected by the second sensor.

* * * * *